United States Patent [19]

Bergthaller

[11] 4,329,441
[45] May 11, 1982

[54] PROCESS FOR THE POLYMERIZATION OF ALLYL AMMONIUM SALTS AND THE RESULTING PRODUCTS

[75] Inventor: Peter Bergthaller, Cologne, Fed. Rep. of Germany

[73] Assignee: AGFA-Gevaert AG Aktiengesellschaft, Leverkusen, Fed. Rep. of Germany

[21] Appl. No.: 206,154

[22] Filed: Nov. 12, 1980

[30] Foreign Application Priority Data

Nov. 17, 1979 [DE] Fed. Rep. of Germany ....... 2946550

[51] Int. Cl.$^3$ ............................................ C08F 26/02
[52] U.S. Cl. .................................. 526/193; 526/245; 526/276; 526/288; 526/291; 526/294; 526/310
[58] Field of Search ............... 526/193, 233, 245, 248, 526/260, 258, 276, 288, 291, 302, 310, 294

[56] References Cited

U.S. PATENT DOCUMENTS

| | | | |
|---|---|---|---|
| 2,543,635 | 2/1951 | Loritsch | 526/193 |
| 2,662,875 | 12/1953 | Chaney | 526/195 |
| 2,921,055 | 1/1960 | Heisenberg et al. | 526/193 |
| 2,949,442 | 8/1960 | Clavier et al. | 526/195 |
| 3,057,833 | 10/1962 | Devlin | 526/310 |
| 4,181,642 | 1/1980 | Holle et al. | 526/193 |

*Primary Examiner*—Paul R. Michl
*Attorney, Agent, or Firm*—Connolly and Hutz

[57] ABSTRACT

A process for the polymerization of allyl ammonium salts is disclosed wherein allyl ammonium salt is polymerized in the presence of a phosphorus compound.

10 Claims, No Drawings

PROCESS FOR THE POLYMERIZATION OF ALLYL AMMONIUM SALTS AND THE RESULTING PRODUCTS

This invention relates to a process for the polymerisation of monomer mixtures containing allyl ammonium salts and to new polymers.

Copolymers containing in particular primary or secondary ammonium salt monomer units or the monomer units containing primary or secondary amino groups derived therefrom at higher pH-values are interesting for various applications. For example, they are of interest in applications where the primary or secondary amino group is required as a nucleophilic and, therefore, alkylatable or acylatable centre in a polymer skeleton, for example for introducing groups bearing functional groups or for introducing crosslinking bridges by reaction with bifunctional or polyfunctional alkylating agents or acylating agents or by polymeranalog carbonamide formation with carboxyl groups thereof or of another macromolecule. For example, crosslinking in dilute phase or under special conditions gives above all intracatenarily crosslinked and, hence, soluble copolymers, whereas crosslinking in more concentrated systems gives insoluble networks which provide the polymer layers based thereon with high mechanical and chemical stability.

In addition, polymers containing amino groups are of interest for applications where, depending on the pH-value of the ambient medium, the amino groups appear as charge carriers, for example in cationic mordants for periodically fixing anionic compounds in polymer layers, for example for the pH-dependent dyeing of binders in photographic layers.

Finally, polymers containing primary or secondary amino groups are of interest for all of those purposes where amino groups are required as complex-forming ligands with an affinity for heavy metals in a polymer molecule, for example for use as protective colloid for noble metals or transition metals in sol form, for improving the adhesion of polymer coatings to metal surfaces or for forming a coherent metal film in the currentless plating of surfaces.

The introduction of primary or secondary amino groups into a copolymer skeleton has a particularly marked effect upon the protective colloid properties with respect to substantially insoluble transition metal or noble metal compounds of semiconductor character. Such compounds may be obtained in the form of particularly agglomeration-stable dispersions by precipitation in the presence of polymers containing amino groups.

Allyl amine and substituted allyl amines are known to be monomers which polymerise particularly sluggishly. Even in the form of salts of strong acids, they polymerise only slowly and incompletely.

Particular problems arise in the copolymerisation of allyl ammonium salts with, in principle, readily copolymerisable monomers or monomer mixtures. The addition of even small quantities of allyl ammonium salts is sufficient to retard the copolymerisation reaction to a considerable extent, producing a significant reduction in the degree of polymerisation and the polymer yield. Of the total quantity of ally ammonium salt used, less than one tenth is actually incorporated as a rule because of the unfavourable position of the copolymerisation parameters (cf. J. Polymer Sci: Polymer Chemistry Ed. Vol. 16, 305 to 308 (1978)).

Any attempt to increase the number of allyl ammonium units incorporated by increasing the monomer input produces only a further reduction in the polymerisation velocity and increases the working-up problems.

Hitherto, there has been no process by which polymerisation reactions can be rapidly carried out in the presence of allyl ammonium salts with complete incorporation of the allyl ammonium salt. This situation has been a considerable hindrance to the use of allyl ammonium salts in polymer chemistry.

A process for the production of amphoteric copolymers containing certain allyl ammonium salt units as cationic constituent is known from U.S. Pat. No. 2,949,442. As can be seen from the text of the Application, this process involves all of the disadvantages referred to above. It is laborious, technically complex and unsatisfactory in regard to the incorporation of the allyl ammonium salt.

One of the objects of the present invention is to provide a process for the polymerisation of allyl ammonium salts.

More particularly, the object of the present invention is to provide a process by which allyl ammonium salts can be quickly copolymerised in a technically simple manner with rapidly and completely polymerising monomers, particularly those of the acryl type, in high yields and with complete incorporation of the allyl ammonium salt used. In addition, the process is intended to provide largely uniform polymers.

Another object of the present invention is to provide a process by which it is possible to obtain solvent-free water-soluble copolymers containing allyl ammonium salt units in copolymerised form which are suitable for use as protective colloids for noble metal or noble metal salt dispersions.

A further object of the present invention is to provide a process by which it is possible to obtain substantially monomer-free solutions of copolymers which contain polymerised units of allyl ammonium salts.

A final object of the present invention is to provide new polymers.

This invention therefore provides (1) a process for the polymerisation of allyl ammonium salts wherein a compound corresponding to formula (I) below

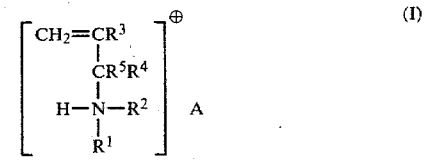

in which $R^1$ and $R^2$ which may be the same or different represent hydrogen; an aliphatic, araliphatic or cycloaliphatic radical preferably containing from 1 to 20 carbon atoms which may optionally be substituted, more particularly by one of the following groups:

hydroxyl, $C_1$–$C_{12}$ alkoxyl, $C_6$–$C_{10}$ aryloxy groups, $C_1$–$C_{12}$ acyloxy groups, $C_1$–$C_{12}$ acylamino groups, $C_1$–$C_{12}$ alkyl or aryl ureido groups, COOH, CONH$_2$, COO-alkyl (with 1 to 12 carbon atoms), CN, Cl, Br, SO$_3\gamma$,

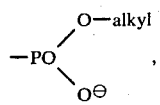

or

R¹ and R² may together form the ring members required to complete a 5- to 7-membered heterocyclic ring, more particularly a pyrrolidone, piperidine, perhydroazepine, morpholine or thiomorpholine ring which may be substituted, R³, R⁴ and R⁵ which may be the same or different represent hydrogen, an alkyl group which may be substituted, more particularly a $C_1$–$C_4$-alkyl group, especially methyl; more particularly hydrogen;

A is an anion, preferably monofunctional or difunctional, more particularly the anion of a strong inorganic or organic acid, particularly chloride, alkane sulphonate, aryl sulphonate, trifluoroacetate, perfluoroalkanoate, perfluoroalkane sulphonate or the sulphonate group of a monomer present in copolymerised or copolymerisable form, and/or R³ represents

is polymerised in the presence of a phosphorus compound corresponding to the following formula

in which $R^{20}$ and $R^{21}$ which may be the same or different represent hydrogen; an alkyl group which may be substituted, more particularly containing from 1 to 12 carbon atoms and preferably from 1 to 4 carbon atoms; an aryl group which may be substituted, particularly phenyl; a hydroxy group; an alkoxy group; particularly containing from 1 to 12 carbon atoms, an aralkyl group, particularly a benzyl group;

an aralkoxy group, particularly a benzyloxy group; or $R^{20}$ and $R^{21}$ may together form a group -O-$R^{23}$-O- where $R^{23}$ is an alkylene radical which may be substituted containing no more than 6 carbon atoms; a dialkyl amino group where the alkyl radical is in particular a $C_1$–$C_4$-alkyl radical or Cl;

$R^{22}$ represents hydrogen; an acyl radical which may be substituted, more particularly of an aliphatic carboxylic acid containing from 1 to 20 carbon atoms or of an aromatic carboxylic acid, especially acetyl, pivaloyl, butyryl, benzoyl; alkyl, particularly containing from 1 to 12 carbon atoms, a dialkyl amino group where the alkyl radical is in particular a $C_1$–$C_4$-alkyl radical, X represents a single electron pair or an oxygen atom, X being an electron pair when none of the radicals $R^{20}$ to $R^{22}$ is hydrogen.

The polymerisation reaction is preferably carried out at temperatures in the range from 60° to 90° C. and, more particularly, at temperatures above 70° C.

In one particularly preferred embodiment, the following groups are present in the compound corresponding to formula (I):

R¹, R² represent hydrogen;

R⁴, R⁵ represent hydrogen;

A represents: Cl

R³ represents -CH₂N⊕H₂R¹ Cl⊖; CH₃ or H

Particularly preferred compounds corresponding to the formula (I) are allyl amine hydrochloride; allyl ammonium methane sulphonate; allyl ammonium trifluoroacetate; allyl ammonium benzene sulphonate; 3-allyl ammonium propane sulphonate; 4-allyl ammonium butane sulphonate; the allyl ammonium salt of 2-acrylamido-2-methyl propane sulphonic acid; the allyl ammonium salts of methacryloyl hydroxy ethane sulphonic acid; allyl ammonium methyl phosphonate; N-ethyl allyl ammonium ethyl sulphate; N-cyanoethyl allyl ammonium chloride; N-hydroxy ethyl allyl ammonium chloride; methallyl ammonium chloride or 2-methylene-1,3-bis-alkyl ammonium propane dichlorides.

In the compounds of formula (II), the phosphorus is preferably present in the oxidation state of +3. Particularly preferred compounds of formula (II) are phosphorus acid, its anhydrides, chlorides, ester chlorides and its monoesters or diesters; and trialkyl phosphites. Other suitable compounds of formula (II) are phosphonous acids and their esters or ester chlorides and, finally, hypophosphorous acid and disubstituted phosphine oxides. Finally, the amides of all the above mentioned acids may also be used. Particular reference is made to diethyl phosphite; ethylene phosphite (2-oxo(2H)-1,3,2-dioxaphosphonite); dibutyl phosphite; phenyl phosphonous acid; phenyl phosphonous acid butyl ester; PCl₃; hexamethyl phosphorous acid triamide and phosphorous acid trimorpholide.

Finally, masked dialkyl phosphites, which only change into dialkyl phosphites on reaction with alcohols in an anhydrous acid-containing medium and then represent effective co-initiators, are the dialkyl esters of acyl phosphonic acid (Kabachnik, Rossijskaja; Izv. Akad. Nauk. SSSR 1965, 597), for example the diethyl ester of methacryloyl phosphonic acid, of which the cleavage product, the methacrylic ester of the alcohol used as polymerisation medium, is incorporated into the polymer.

Furthermore, the invention provides:

(2) a process for the copolymerisation of compounds corresponding to formula (I) with at least one other comonomer of the acryl type in the presence of a compound corresponding to formula (II).

The invention further provides:

(3) new polymers containing recurring units corresponding to formula (III) below

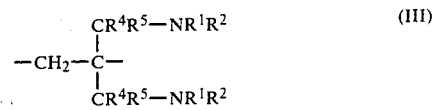

which may be present in salt form.

Polymers corresponding to formula (III) may be obtained by polymerising compounds of formula (I) where R³ is the group (—CR⁴R⁵—NR¹R²H)+A, in the presence of a compound corresponding to formula (II). Polymers produced in accordance with the invention may be in the form of ammonium salts or amines, depending on the pH value.

In principle, the monomer mixture to be polymerised may have any composition. In addition to the compounds of formula (I), it preferably contains comonomers of the acryl type and may also contain comonomers containing electron donor groups in the molecule. The proportion of these particular comonomers is preferably less than 20%, based on the acryl monomer, and less than 10%, based on all of the monomers. In addition, neutral monomers, such as styrene, may be copolymerised.

Of the comonomers of the acryl type, the following are mentioned in particular: acrylamide; acrylic acid-t-butyl amide; N-cyclohexyl acrylamide; methyl acrylate; ethyl acrylate; butyl acrylate; 2-hydroxy ethyl acrylate; 2-hydroxy propyl acrylate; acrylonitrile; acrylic acid; dimeric acrylic acid (3-acryloyl hydroxy propanoic acid); 2-acrylamido-2-methyl propane sulphonic acid; methacrylic acid; 2-hydroxy ethyl methacrylate; methyl methacrylate; methacrylonitrile; sulpho-ethyl methacrylate; itaconic acid, itaconic acid dimethyl ester; itaconic acid monobutyl ester; itaconic acid methoxy ethyl ester; itaconic acid mono-n-hexyl amide; N-sulphoethyl itaconic acid monoamide; maleic acid, maleic acid anhydride; itaconic acid anhydride; maleic acid diethyl ester or fumaric acid diethyl ester. Acrylamide and acrylic acid are particularly preferred.

Of the comonomers containing electron donor groups, the following are mentioned: N-vinyl-N-alkyl amides; N-vinyl lactams; N-vinyl oxazolidinones; N-vinyl imidazoles; N-allyl imidazoles; N-methallyl imidazoles; vinyl sulphides; vinyl ethers; 1-acyloxy-2-acyloxy-2-methyl propenes; vinyl carboxylates; allyl ethers and the allyl ethers of aliphatic carboxylic acids;

The proportion of monomers of the allyl ammonium salt type corresponding to formula (I), based on all the monomers, during the copolymerisation reaction preferably amounts to at most 50 mole percent.

Copolymers of particular commercial interest contain from 5 to 30 mole percent of allyl ammonium salt units in copolymerised form, the remainder consisting of copolymerised monomers of the acryl type.

Polymerisation is carried out by basically known processes in the presence of polymerisation initiators. In this connection, reference is made to Ian M. G. Cowie "Chemie und Physik der Polymeren", page 52, Verlag Chemie, Weinheim 1976, and to Chapter IId "Erniedrigung des Molekulargewichts durch Regler (Reducing Molecular Weight by Regulators)" in Houben-Weyl, Methoden der Organischen Chemie, Vol XIV/1, pages 318 to 327. Typical initiators suitable for the purposes of the invention are azoisobutyronitrile, 2,2'-azo-bis-(2,4-dimethyl valeronitrile); symmetrical azo-bis-mercapton compounds according to German Offenlegungsschrift No. 2,518,622, di-tert.-butyl peroxide; tert.-butyl cumyl peroxide; dicumyl peroxide; 4,4'-di-tert.-butyl peroxy valeric acid-n-butyl ester; tert.-butyl peracetate; tert.-butyl perpivalate; tert.-butyl perbenzoate; tert.-butyl peroxy isopropyl carbonate; tert.-butyl peroxy-2-ethyl hexanoate; diisopropyl peroxy dicarbonate; dipropionyl peroxide; dioctanoyl peroxide; dilauroyl peroxide; dibenzoyl peroxide; dicyclohexyl peroxy dicarbonate; potassium persulphate; hydrogen peroxide; peracetic acid and monoperphthalic acid. The type of initiator used is essentially determined by the polymerisation conditions selected and by the type of monomers used.

In this connection, reference is made to Houben-Weyl, Methoden der Organischen Chemie, 4th Edition, 1961, Vol. XIV/1, pages 209 et seq.

The optimum initiator may be determined by comparison tests.

The solvents used may be aqueous or non-aqueous systems. The polymerisation medium does not have to be homogeneous. It is preferred to use solvents which dissolve all of the monomers. The addition of regulating solvents, such as isopropanol, is occasionally favourable, although it may result in a reduction of yield and of average molecular weight.

Suitable solvents for carrying out the polymerisation reaction are any of the solvents normally used in the polymerisation field, above all those having relatively low chain transfer constants, for example water; tert. butanol; 2-methoxy ethanol; acetonitrile; ethyl acetate; 1,2-dimethoxy ethane; dioxane; 2-methoxy ethanol; benzene; chlorobenzene and o-dichlorobenzene. Mixtures of t-butanol with chlorobenzene in a ratio of from 1:10 to 10 are particularly favourable.

The average molecular weight of the polymers produced by the process according to the invention is preferably in the range from 20,000 to 400,000, although it is possible to obtain higher or lower molecular ranges, depending on the conditions selected. In general, the position of the average molecular weight depends on the quantity of initiator and on the proportion of phosphorus compound. Quantities of from 0.2 to 5 mole percent of phosphorus compound and from 0.05 to 2 mole percent of initiator, based on monomer, may be regarded as particularly favourable. The phosphorus compound is generally used in a 1 to 10-fold molar excess, based on the initiator.

It has proved to be best either to add the initiator together with the phosphorus compound and separately from the monomers during the polymerisation reaction or initially to introduce the initiator together with part of the solvent and then to add the phosphorus compound together with the monomers.

The polymerisation reaction is preferably carried out in the form of precipitation polymerisation, i.e. in a solvent which does not dissolve the polymer, and gives the polymers in the form of colourless and readily filterable powders which are easy to dry. However, it may also be carried out by other methods, for example by solution polymerisation, the high degree of conversion obtained in the process according to the invention and, above all, the complete incorporation of the allyl ammonium salts making it possible for the polymer solutions to be used without further purification.

Depending on the type and quantity of individual monomers used, the polymers obtained show different properties which make them suitable for a variety of applications.

Thus, water-soluble, hydrophilic copolymers containing a very high proportion of acrylamide (up to 80%) and little or no hydrophobic monomers, for example butyl acrylate or 2-ethyl hexyl acrylate, are suitable for use as protective colloids for stabilising aqueous dispersions of hydrophobic constituents.

The production of a few polymers is described by way of example in the following.

COPOLYMERS

COPOLYMER 1

A solution of 35.5 g of acrylamide, 56.8 g of allyl ammonium chloride and 0.28 g of diethyl phosphite in 400 ml of tert.-butanol and 400 ml of chlorobenzene is added dropwise under nitrogen with stirring over a period of 60 minutes at reflux temperature (83° C.) to a solution of 0.2 ml of tert.-butyl peroctoate in 90 ml of t-butanol and 10 ml of chlorobenzene. 0.1 ml of tert.-butyl peroctoate is then added, followed by refluxing for 5 hours. After cooling, the product is filtered off under suction, washed with isopropanol and dried in vacuo at 60° C. Yield 67 g (81% of the theoretical).

Analysis: $Cl_{calculated}$: 21.6%: $Cl_{observed}$: 20.6%.

COPOLYMER 2

Monomer solution: 42.6 g (0.6 mole) of acrylamide, 12.8 g (0.1 mole) of butyl acrylate, 10.8 (0.15 mole) of acrylic acid stabilised with 0.1% of butyl hydroquinone, 14.0 g (0.15 mole) of allyl ammonium chloride, 0.28 g of diethyl phosphite in 400 ml of t-butanol and 40 ml of chlorobenzene.

The procedure is as described in Example 1. Yield: 71 g (88% of the theoretical).

Analysis: $Cl_{calculated}$: 6.63%: $Cl_{observed}$: 6.0%.

COPOLYMER 3

Monomer solution: 39 g of acrylamide (0.55 mole), 12.8 g of butyl acrylate (0.1 mole), 17.2 g of methacrylic acid (0.2 mole); (freshly distilled over copper-acetate); 14.0 g of allyl ammonium chloride, 1.5 g of diethyl phosphite, 400 ml of t-butanol, 40 ml of chlorobenzene.

The procedure is as described in Example 1.

Yield: 70 g (84% of the theoretical).

Analysis: $Cl_{calculated}$: 6.47% $Cl_{observed}$: 5.5%.

COPOLYMER 4

Monomer solution: 39 g of acrylamide (0.55 mole), 12.8 g of butyl acrylate (0.1 mole), 17.2 g of methacrylic acid (0.2 mole), 14.0 g of allyl ammonium chloride, (0.15 mole), 400 ml of t-butanol, 40 ml of chlorobenzene.

The monomer solution is added under reflux in 10 portions over a period of 1 hour to a solution (intensively stirred under nitrogen) of 0.1 ml of tert.-butyl peroctoate in 100 ml of t-butanol and 10 ml of chlorobenzene, followed by refluxing for another hour. Only a few flakes of a greasy polymer are precipitated.

0.3 ml of diethyl phosphite is then added. After 5 minutes, the contents of the flask have changed into a white paste. 0.1 ml of t-butyl peroctoate are added, followed by refluxing for 6 hours. After cooling and filtration under suction, the product is worked up in the same way as in Example 1.

Yield: 67 g (81% of the theoretical)

Analysis: $Cl_{calculated}$: 6.4%: $Cl_{observed}$: 6.6%: P: less than 0.1% (not verified).

Example 4 shows that polymerisation only begins after the addition of the phosphorus compound and that it is only the added phosphorus compound which leads to the formation of a useful polymer.

COPOLYMER 5

The procedure is as in Example 3, except that phenyl phosphonous acid (5 g=3 mole percent based on monomer) is used as the phosphorus compound.

Yield: 71 g (85% of the theoretical).

COPOLYMER 6

Monomer solution: 28.4 g (0.4 mole) of acrylamide, 25.6 g (0.2 mole) of butyl acrylate, 41.4 g (0.2 mole) of 2-acrylamido-2-methyl propane sulphonic acid, 11.4 g (0.2 mole) of allyl amine, 0.5 ml of 60% $H_3PO_2$, 500 ml of t-butanol.

The procedure is as in Example 1. Yield: 80 g (75% of the theoretical).

Analysis: $S_{calculated}$: 5.99%: $S_{observed}$: 6.45%.

The polymer is soluble in water (pH=5).

Another 11 g of a copolymer which forms a clear solution in water-methanol 1:1 (fractions richer in butylate) can be precipitated with toluene from the concentrated mother liquor of the copolymer.

COPOLYMER 7

Monomer solution: 76.8 g (0.6 mole) of butyl acrylate, 41.4 g (0.2 mole) of 2-acrylamido-2-methyl propane sulphonic acid, 11.4 g (0.2 mole) of allyl amine, 0.4 ml of dimethyl phosphite, 500 ml of t-butanol.

The procedure is as in Example 1, except that the polymer remains in solution and may be recovered in the form of a water-soluble syrup after concentration by evaporation in vacuo. Yield (as determined from the residue) 119 g (92% of the theoretical).

On evaporation of an aqueous polymer solution (5%) containing 10% by weight of KOH, there is no trace of any allyl amine odour.

COPOLYMER 8

Monomer solution: 49.7 g (0.7 mole) of acrylamide, 18.4 g (0.1 mole) of 2-ethylhexyl acrylate, 13 g (0.1 mole) of itaconic acid, 11.4 g (0.1 mole) of allyl amine-HCl, 0.3 ml of diethyl phosphite, 500 ml of t-butanol.

The procedure is as described in Example 1. Polymerisation time: 7 hours at 83° C.

Yield: 90 g (97% of the theoretical).

COPOLYMER 9

Monomer solution: 25.5 g (0.5 mole) of acrylamide, 30 g (0.3 mole) of methyl methacrylate, 7.2 g (0.1 mole) of acrylic acid, 5.7 g (0.1 mole) of allyl amine, 17.2 g (0.1 mole) of anhydrous, p-toluene sulphonic acid, 0.4 g of phenyl phosphonous acid, 350 ml of t-butanol, 150 ml of chlorobenzene.

The procedure is as in Example 1. Polymerisation time: 8 hours. Yield: 74.5 g (78% of the theoretical).

Analysis: $S_{calculated}$: 3.35%: $S_{observed}$: 4%.

COPOLYMER 10

Monomer solution: 60 g of ethyl acrylate (0.6 mole), 14.4 g of acrylate acid (0.2 mole), 22.8 g of allyl amine-HCl (0.2 mole), 300 ml of tert.-butanol.

Initiator solution: 0.3 ml of t-butyl perpivalate, 0.5 ml of phenyl phosphinic, acid-n-butyl ester, 100 ml of t-butanol.

Receiving solution: 0.1 ml of t-butyl peroctoate in, 100 ml of t-butanol.

The receiving solution is heated under nitrogen to reflux temperature. 1 quarter of the monomer solution and 1 quarter of the initiator solution are added under reflux with stirring at hourly intervals over a period of 4 hours. After refluxing for 4 hours, a total of 250 ml of t-butanol is distilled off under reduced pressure. Thereafter the ethyl acrylate odour has disappeared. The viscous solution is made up with methanol to a total volume of 1000 ml.

Yield: (as determined from the residue) 90 g (93% of the theoretical).

Comparison Test

COPOLYMERS 11 TO 13

COPOLYMER 11 (using the process according to U.S. Pat. No. 2,949,442)

Monomer solution: 10 g of allyl amine.HCl 10 g of acrylamide, 5 g of acrylic acid, 50 mg of potassium metabisulphite, 50 ml of boiled, nitrogen-purged water.

Initiator solution: 200 mg of potassium persulphate in, 50 ml of boiled water.

The monomer solution is added dropwise under nitrogen over a period of 60 minutes to the initiator solution kept at 38° C., after which the temperature is kept at 38° to 40° C. for 6 hours, followed by boiling. The pH is then adjusted to 7 and the mixture is stirred into acetone (50 ml). After dissolution and reprecipitation, the copolymer is largely insoluble.

COPOLYMER 12 (with non-peroxidic initiator)

Monomer solution: 10 g of allyl amine.HCl, 10 g of acrylamide, 5 g of acrylic acid,
50 mg of diethyl phosphite, 100 ml of tert.-butanol+100 ml of chlorobenzene.

Receiving solution: 250 mg of azoisobutyronitrile in, 50 ml of tert.-butanol.

The procedure is as in Example 1, except that a total of 250 mg of azoisobutyronitrile in 50 ml of t-butanol is added during the 5-hour after-heating period. Yield: quantitative.

Analysis: $Cl_{calculated}$: 15.2%: $Cl_{observed}$: 12.2%.

The polymer is highly soluble in water.

COPOLYMER 13 (with peroxidic initiator)

Monomer solution: same as for copolymer 12

Receiving solution: 0.1 ml of t-butyl peroctoate in, 50 ml of tert.-butanol.

The procedure is as described in Example 1, a total of 0.2 ml of t-butyl peroctoate being subsequently added.

Yield: 23 g.

Analysis: $Cl_{calculated}$: 15.2%: $Cl_{observed}$: 13.8%.

The polymer is highly soluble in water.

The comparison test with copolymers 11 to 13 shows clearly that the process according to the invention gives superior results. The conventionally produced copolymer 11 is prone to crosslinking and unstable.

COPOLYMER 14

Monomer solution: 31.8 g (0.6 mole) of acrylonitrile, 14.4 g (0.2 mole) of acrylic acid, 18.7 g (0.2 mole) of allyl amine.HCl, 0.4 ml of 60% $H_3PO_3$, 200 ml of t-butanol, 200 ml of chlorobenzene.

The procedure is as described in Example 1.

Yield: 50 g (77% of the theoretical).

Analysis: $Cl_{calculated}$: 10.9%: $Cl_{observed}$: 12.9%.

The analysis shows that the allyl amine HCl was incorporated predominantly into the relatively high molecular weight copolymer fractions.

COPOLYMER 15

Monomer solution: 35.5 g (0.5 mole) of acrylamide, 25.6 g (0.2 mole) of butyl acrylate, 10.8 g (0.15 mole) of acrylic acid, 14.0 g (0.15 mole) of allyl amine HCl, 0.3 ml of diethyl phosphite, 400 ml of t-butanol, 40 ml of chlorobenzene.

The procedure is as described in Example 1.

Yield: 60 g (70% of the theoretical).

Analysis: $Cl_{calculated}$: 6.2%: $Cl_{observed}$: 6.0%.

Concentration of the mother liquor by evaporation leaves a polymer fraction (yield 20 g) which, although still soluble in water, separates out on the addition of 10% NaCl solution.

COPOLYMER 16

1. Production of a crude ethylation product of allyl amine: 31 g (0.2 mole) of diethyl sulphate are added dropwise at 25° C. to 11.4 g (0.2 mole) of allyl amine in 100 ml of methanol. After refluxing for 1 hour, the product is concentrated by evaporation in vacuo and taken up in 400 ml of t-butanol.

2. Following the addition of 42.6 g (0.6 mole) of acrylamide and 14.4 g of acrylic acid (0.2 mole), the monomer solution and, at the same time, a solution of 1.5 ml of diethyl phosphite and 0.4 ml of t-butyl peroctoate in 150 ml of chlorobenzene are added dropwise under reflux over a period of 2 hours to 150 ml of t-butanol stirred under reflux. After heating for another 2 hours, 0.1 ml of diethyl phosphite and 0.1 ml of t-butyl peroctoate are added, followed by refluxing for another 4 hours. After cooling to 35° C., the product is filtered under suction, washed twice with 200 ml of ethyl acetate and dried in vacuo at 50° C. Yield: 84 g (85% of theoretical).

COPOLYMER 17

Monomer solution: 49.7 g (0.7 mole) of acrylamide, 45.8 g (0.3 mole) of N-allyl glycine, hydrochloride, 0.3 ml of diethyl phosphite, 500 ml of t-butanol, 50 ml of chlorobenzene.

The procedure is as described in Example 1.

Yield: 70 g (73% of the theoretical).

COPOLYMER 18

1. 41 g (0.3 mole) of butane sulphone are added dropwise under reflux to a solution of 51 g of allyl amine (0.9 mole) in 100 ml of methanol. After stirring under reflux for 12 hours, the methanol is evaporated off. The crude sulphobutylation product is taken up in 600 ml of 2-methoxy ethanol and 60 ml of water.

2. Following the addition of 28.4 g of acrylamide (0.4 mole) and 38.4 g (0.3 mole) of butyl acrylate, the monomer solution and, at the same time a solution of 0.6 ml of dimethyl phosphite and 0.4 ml of t-butyl peroctoate in 100 ml of chlorobenzene are added dropwise to 200 ml of 2-methoxy ethanol kept under reflux. After 3 hours, 0.2 ml of t-butyl peroctoate and 0.2 ml of dimethyl phosphite are added. After 6 hours, polymerisation is terminated and the mixture is cooled to 45° C. The polymer is filtered off under suction, washed with 200 ml of isopropanol and 200 ml of ethyl acetate and dried in vacuo at 60° C.

Yield: 79 g (63% of the theoretical). 40 g of butanol-soluble polymer remained in the mother liquor.

Analysis: $S_{calculated}$: 7.7%: $S_{observed}$: 9.5%.

COPOLYMER 19

Copolymer of 49.7 g (0.70 mole) of acrylamide, 12.8 g (0.10 mole) of butyl acrylate, 7.2 g (0.10 mole) of acrylic acid, 15.6 g (0.10 mole) of allyl chloroethyl, ammonium chloride produced from 2-hydroxy ethyl amine HCl with thionyl chloride in chloroform in the presence of 2% by weight of dimethyl formamide.

The procedure is as described in Example 1.

Yield: 70 g (82% of the theoretical).

Analysis: $Cl_{calculated}$: 8.32%: $Cl_{observed}$: 7.0%.

An aqueous solution of the copolymer adjusted to pH 7 dries to form an insoluble film.

COPOLYMER 20

Copolymer of 53.3 g (0.75 mole) of acrylamide, 7.2 g (0.1 mole) of acrylic acid, 14 g of allyl amine hydrochloride.

The procedure is as described in Example 1.
Yield: 75 g (100% of the theoretical).
Analysis: $Cl_{calculated}$: 7.17%: $Cl_{observed}$: 7.05%.

COPOLYMER 21

The procedure is as described in Example 1, except that 35% hydrogen peroxide (0.4 ml) is used as initiator instead of 0.3 ml of t-butyl peroctoate.
Yield: 70 g (94% of the theoretical).
Analysis: $Cl_{calculated}$: 7.15%: $Cl_{observed}$: 7.0%.

COPOLYMER 22

The procedure is as described in Example 1, except that 0.7 g of azobisisobutyronitrile is used as initiator and is added, as follows, dissolved in chlorobenzene: 0.2 ml before addition of the monomer, 0.1 ml at hourly intervals over a 6-hour after-heating period. Yield: 70 g (94% of the theoretical).
Analysis: $Cl_{calculated}$: 7.15%: $Cl_{observed}$: 6.85%.

COPOLYMER 23

(a) 1,3-bis-ethylamino-2-methylene propane:

125 g of 2-chloromethyl-3-chloropropene are added dropwise under reflux to 1000 ml of a 40% ethyl amine solution and 500 ml of methanol. After refluxing for 2 hours, the solution is concentrated by evaporation to a volume of 500 ml, alkylised with 80 g of sodium hydroxide and 300 ml of saturated potassium carbonate solution are added to complete phase separation. The oil phase is separated off, dried with potassium carbonate and fractioned in vacuo. Yield: 100 g (70% of the theoretical), $Bp_{14\ mb}$: 73°–77° C.

(b) To produce the hydrochloride, HCl is introduced into a solution cooled to 15° C. of 14.2 g of 1,3-bis-ethylamino-2-methylene propane in 100 ml of t-butanol. After the calculated amount has been absorbed, the product is precipitated with 300 ml of ethyl acetate, cooled to 0° C. and filtered under suction. Yield: 22 g of the following compound:

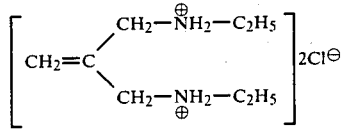

(c) for copolymerisation, 22 g (0.1 mole) of the hydrochloride, 20 g (0.1 mole) of Li-4-sulphobutyl acrylate and 57 g (0.8 mole) of acrylamide are taken up in 500 ml of 2-methoxy ethanol. The monomer solution and, at the same time, a solution of 1.4 g of diethyl phosphite and 0.5 ml of t-butyl peroctoate in 100 ml of chlorobenzene are added dropwise over a period of 1 hour to 200 ml of t-butanol kept under reflux in a nitrogen atmosphere. The reflux temperature gradually rises to 85° C., the polymer precipitating in the form of a white sludge. After another 4 hours under reflux, the polymer is cooled, filtered off under suction, washed with ethyl acetate and dried in vacuo. Yield: 90 g. Cl: observed <0.2%. Assuming a hybrid-ion structure, the yield is quantitative.

COPOLYMER 24

(a) 4-Allyl morpholine 60 g of allyl bromide are added dropwise under reflux to a solution of 200 g of morpholine in 400 ml of isopropanol. After 4 hours under reflux, the solution is concentrated by evaporation in a rotary evaporator and the product taken up in 100 ml of 20% sodium hydroxide. Phase separation is completed by the addition of 20 g of potassium carbonate, after which the product is separated off and distilled after drying over potassium hydroxide. Yield: 50 g.

For conversion into the hydrochloride, the product is dissolved in 200 ml of t-butanol and HCl is introduced into the resulting solution until its weight has increased by 20 g. The hydrochloride is precipitated with chlorobenzene and taken up without drying in t-butanol.

(b) For copolymerisation, a monomer solution prepared from half the allyl morpholinium chloride solution prepared in accordance with (a) (=0.2 mole), 14.4 g of acrylic acid and 42.6 g of acrylamide in 500 ml of t-butanol and, at the same time, a solution of 0.5 ml of t-butyl peroctoate and 1.4 g of diethyl phosphite are added dropwise to 200 ml of t-butanol and 100 ml of chlorobenzene kept under reflux in a nitrogen atmosphere. After a polymerisation time of 5 hours, the mixture is cooled to room temperature, the polymer is filtered off under suction, washed with ethyl acetate and then dried in vacuo. Yield: 60 g (67% of the theoretical).

COPOLYMER 25

The procedure is the same as for copolymer 23, except that the hydrochloride

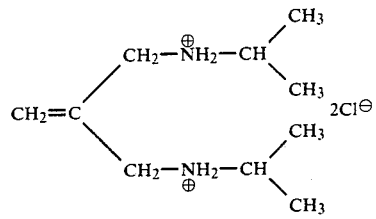

produced from the base obtainable in accordance with Example 23 ($Bp_{14}$: 84°–87° C.) is used instead of 1,3-bis-ethylamino-2-methylene propane in the form of its hydrochloride. Yield: 86 g.

COPOLYMER 26

(a) 1,3-bis-methylamino-2-methylene propane:

The procedure is the same as in Example 23a, except that a 37% methyl amine solution is used instead of ethylamine. Yield: 60 g (54% of the theoretical, Bp 105°–110° C.).

(b) The hydrochloride is produced in the same way as described in Example 23b).

(c) Copolymerisation is carried out in the same way as in Example 16.2, except that the monomer solution has the following composition:

46.15 g of acrylamide (0.65 mole)
12.8 g of butyl acrylate (0.1 mole)
10.8 g of acrylic acid, stabilised (0.15 mole)
18.7 g of the hydrochloride from (b) (0.1 mole)
Yield: 84 g (95% of theoretical)

Analysis: $Cl_{calc}$: 8.0%: $Cl_{observed}$: 7.65%.

COPOLYMER 27

A solution of
1. 46.8 g of allyl ammonium, chloride 35,5 g of Acrylamide and, 0.5 g of diethyl phosphite in, 500 ml of t-butanol.
and a solution of
2. 0.3 g of azoisobutyronitrile in, 50 ml of chlorobenzene. are simultaneously added dropwise with stirring in a nitrogen atmosphere to 100 ml of t-butanol kept under reflux. The addition takes 60 minutes and is followed by refluxing for 3 hours. During the first 2 hours' stirring, another 0.3 g of azoisobutyronitrile in 50 ml of chlorobenzene are added dropwise. After cooling to 20° C., the polymer is filtered off under suction, washed with ethyl acetaate and dried in vacuo at 60° C. Yield: 66 g (80% of the theoretical). The copolymer is soluble in water over the entire pH range.

I claim:

1. A process for the polymerisation of allyl ammonium salts, wherein a compound corresponding to the following formula

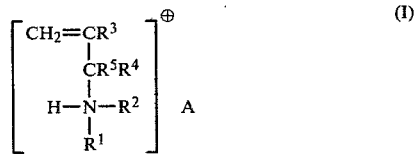

in which
R$^1$ and R$^2$ which may be the same or different and represent hydrogen; an aliphatic, araliphatic or cycloaliphatic radical which may be substituted or R$^1$ and R$^2$ may together represent the atoms required to complete a 5- to 7-membered heterocyclic group;
R$^3$ to R$^5$ which may be the same or different, represent hydrogen or an alkyl radical which may be substituted,
A is an anion and/or
R$^3$ represents the radical

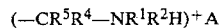

is polymerised in the presence of a phosphorus compound corresponding to the following formula

in which
R$^{20}$ and R$^{21}$ which may be the same or different, represent hydrogen; an alkyl group which may be substituted; an aryl group which may be substituted; hydroxyl; alkoxy; aralkyl; aralkoxy; dialkylamino; or R$^{20}$ and R$^{21}$ represent the group —O—R$^{23}$—O— where R$^{23}$ is an alkyl radical which may be substituted containing no more than 6 carbon atoms, R$^{22}$ represents hydrogen; an acyl group which may be substituted; alkyl; dialkylamino;
X represents a single electron pair or an oxygen atom,
X represents a single electron pair when none of the substituents R$^{20}$ to R$^{22}$ represents hydrogen.

2. A process as claimed in claim 1, wherein the polymerisation is carried out at a temperature in the range from 60° to 90° C.

3. A process as claimed in claim 1, wherein the phosphorus atom in the compound (II) is present in the oxidation state of +3.

4. A process as claimed in claim 1, wherein the polymerisation reaction is carried out with copolymerisation of an ethylenically unsaturated comonomer of the acryl type.

5. A process as claimed in claim 4, wherein the polymerisation reaction is carried out with allyl ammonium salts.

6. A process as claimed in claim 1, wherein
R$^1$, R$^2$, R$^4$, R$^5$ represent hydrogen
R$^3$ represents hydrogen; CH$_2$NH$_2$R$^1$ or methyl
A represents chloride
R$^{20}$ and R$^{21}$ represent hydrogen; alkyl containing from 1 to 12 carbon atoms which may be substituted; phenyl; hydroxy; alkoxy containing from 1 to 12 carbon atoms; benzyl or aralkoxy;
R$^{22}$ represents hydrogen; acetyl, pivaloyl, butyryl, benzoyl or alkyl containing from 1 to 12 carbon atoms and
X represents an oxygen atom.

7. A process as claimed in claim 6, wherein the comound of formula (II) is phosphorus acid or a monoester or diester of phosphorous acid.

8. A process as claimed in claim 1, wherein the compound of formula (I) is a salt of allyl amine and in that the compound of formula (II) is at least one of the following substances: dibutyl phosphite; diethyl phosphite; phenyl phosphinic acid; phenyl phosphinic acid butyl ester or hypophosphorous acid.

9. A process as claimed in claim 8, wherein acrylamide and/or acrylic acid is used as additional comonomer.

10. Polymers containing recurring units of the following formula:

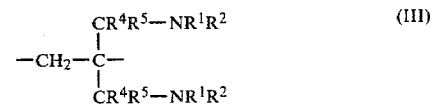

in which
R$^1$ and R$^2$ which may be the same or different, represent hydrogen; an aliphatic, araliphatic or cycloaliphatic radical which may be substituted or R$^1$ and R$^2$ may together represent the atoms required to complete a 5-membered to 7-membered heterocyclic group, and
R$^3$ to R$^5$ which may be the same or different represent hydrogen or alkyl which may be substituted, or a salt thereof.

* * * * *